United States Patent Office 3,290,164
Patented Dec. 6, 1966

3,290,164
CLAY COATED WITH HALOALKYL PHOSPHORUS ESTER AND POLYESTER RESINS CONTAINING THE SAME
Thomas H. Ferrigno, Metuchen, N.J., assignor to Minerals & Chemicals Philipp Corporation, Menlo Park, N.J., a corporation of Maryland
No Drawing. Filed Feb. 15, 1962, Ser. No. 173,363
11 Claims. (Cl. 106—308)

The subject invention relates to kaolin clay which is coated with a halogenated organic phosphorus compound and relates also to improved polyester resin compositions formulated with the novel coated clay.

Kaolin clay, in its naturally occurring hydrophilic state, is used as a mineral filler in the production of thermoset plastics from liquid unsaturated polyester resins. The clay is mixed with a liquid polymerizable unsaturated polyester resin and the mixture, together with a peroxide catalyst and frequently auxiliary ingredients, is cured to crosslink the polyester into a thermoset plastic product. Usually glass fibers are included in the composition as a reinforcing agent. In the case of polyester premixes (frequently called "doughs" or "gunks"), the glass fibers are uniformly mixed with the liquid polyester and filler and the thick mass is molded. In carrying out the so-called "preform" method, a mixture of polyester and filler is impregnated on a mat of glass fibers and the impregnated glass is molded to produce a thermoset glass laminate. The clay is used principally as a bulking agent and also to minimize shrinkage of the resin during curing. The clay is not used, however, to improve the strength of the thermoset resin and, in fact, the use of naturally occurring clay in large quantities usually appreciably reduces the the tensile and flexural strength of the plastic product, particularly in premixes.

Furthermore, the clay, being hydrophilic in nature, is not readily wet by the liquid polyester resin and it is difficult to disperse the clay in the liquid resin. When used in appreciable quantity, the clay increases the viscosity of the liquid polyester to a considerable degree and produces a marked thixotropic effect. In some instances, the resultant thickening effect is desirable and for certain vertical molding layups and coating applications, thixotropy in polyester resins is highly desirable. However, in many other instances a marked thickening effect of the clay on the polyester resin is very undesirable inasmuch as it limits significantly the quantity of clay filler which can be incorporated in the polyester while providing a mixture of moldable consistency.

It has been suggested to coat clay with various organic compounds to improve the dispersibility of the clay in liquid organic media such as unsaturated polyester resins. Certain aliphatic amines and amine salts have been found to be very effective in promoting the dispersion of the clay in liquid polyester resins. However, the clay coated with amine cannot be incorporated into organic media without producing an undesirable thickening effect. Moreover, this type of coating contributes substantially little, if anything, to the strength of a clay-filled molded polyester resin.

A principal object of my invention is the provision of a novel organic coated kaolin clay having organophilic properties. A more particular object is to provide a finely divided kaolin clay product especially useful as a reinforcing filler in a thermoset resin prepared from a liquid unsaturated polyester resin. Another object is to provide finely divided coated kaolin clay which can be dispersed readily in liquid unsaturated polyester resins in appreciable quantities without significantly increasing the viscosity of the resin. Still another object of my invention is the provision of organic coated kaolin clay which, when used as a filler in plastics made from liquid unsaturated polyester resins, results in a composition having greater tensile strength and flexural strength than plastics made with the uncoated clay as a filler. A further object of my invention is the provision of improved molding compositions containing liquid polymerizable unsaturated polyester resins.

Further objects and features of the invention will be apparent from the description thereof which follows.

I have discovered that the usefulness of kaolin clay as a filler in plastics prepared from liquid polymerizable unsaturated polyester resins can be improved by coating particles of the clay, prior to incorporating the clay into the liquid resin, with a class of organic phosphorus compounds described hereinafter.

Briefly stated, the novel filler of this invention consists of kaolin clay, the particles of which are uniformly coated with a small amount of a tri-haloalkyl ester of an acid selected from the group consisting of phosphoric acid and phosphorus acid. Preferably, the ester is heated in the presence of the clay before incorporation of the coated clay into a liquid organic vehicle since the effectiveness of the coating is markedly enhanced in this manner.

The coated kaolin clay product described above is useful as a filler in the formulation of molded plastics from polymerizable liquid unsaturated polyesters by both the premix and preform methods and is also useful as a pigment in polyester gel coats. In these various types of molding compositions, the coated clay product may be dispersed more readily in the liquid polyester vehicle than the normally hydrophilic naturally occurring clay and the viscosity of unsaturated liquid polyester compositions containing coated clays of this invention is usually less than or about the same as the viscosity of the liquid polyester containing the same quantity of uncoated clay of the same particle size. The viscosity will vary with the quantity of coating agent used and with the particle size of the clay. In the case of premixes or "gunks," as they are usually called, the thermoset resin filled with the coated clay has appreciably higher tensile strength and flexural strength than a like resin filled with the same quantity of naturally occurring clay of the same or finer particle size. In preforms, the use of the coated clay results in a laminate having higher flexural strength than a laminate prepared with uncoated clay.

As examples of suitable tri-haloalkyl phosphate and phosphite coating agents may be mentioned tris(2-chloroethyl) phosphate 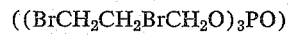, tris(2-chloroethyl) phosphite $((ClCH_2CH_2O)_3P)$, tris(dichloropropyl) phosphate, tris(2,3-dibromopropyl) phosphate

tris(2-bromoethyl) phosphite and tris(2-bromoethyl) phosphate.

The clay that is employed in carrying out this invention is kaolin clay, by which is meant a clay whose predominating mineral species is kaolinite, halloysite, anauxite, dickite or nacrite. These minerals are all hydrous aluminum silicates of the empirical formula $$Al_2O_3 \cdot 2SiO_2 \cdot 2H_2O$$

Kaolin clay, as mined, consists of fine particles together with coarse agglomerates and grit (principally quartz). It is the usual practice of clay processors to remove from the clay coarse agglomerates and gritty matter. For some commercial uses, kaolin clay is fractionated, as by hydraulic or air sedimentation methods, to obtain a fraction of clay having the desired particle size. Usually the clay is fractionated to obtain a very fine fraction which is particularly useful as an ingredient of paper coating compositions. This leaves a coarse fraction, the particle size distribution of which will depend on the amount of fines removed from the whole clay during the fractionation. In carrying out my invention, I prefer to use a coarse fraction size of clay which has an average equivalent spherical diameter from 4 to 15 microns and is free from grit and particles larger than 44 microns. Whole clay (which usually has an average equivalent spherical diameter of about 1.5 micron) and fine fractions of whole clay can also be used. All micron particle sizes, as used herein, are expressed as equivalent spherical diameters and are obtained by the well-known Andreasen method (a water sedimentation method) assigning 2.5 as the value of particle density. The term "average equivalent spherical diameter" refers to the particle size of a material which is so chosen that 50 percent by weight of the particles will be finer than that value.

It is also within the scope of this invention to employ a kaolin clay which has been calcined prior to the incorporation of phosphorus ester coating agent therewith. The coated calcined clay is especially useful as a pigment in polyester gels where it may replace all or a portion of the more expensive titania pigment with good results. Calcined kaolin clay pigments are obtained by heating the clay at a temperature within the range of about 1650° F. to about 1800° F. for time sufficient to dehydrate the clay substantially completely.

In putting this invention into practice, I uniformly coat the clay particles with a very small quantity of the haloalkyl phosphorus ester. Various methods are suitable for the purpose. The simplest procedure involves dry milling the clay with an appropriate quantity of ester. Inasmuch as the effectiveness of the haloalkyl phosphorus ester coating depends on its uniform distribution on the surface of the clay particles, the coating material is preferably applied in the form of a solution, after which the solvent is removed from the clay and ester, as by drying, and the aggregates of coated clay pulverized to particles substantially all of which are minus 44 micons. As mentioned, the clay (calcined or uncalcined) is preferably subjected to heat in the presence of the tri-haloalkyl phosphorus ester coating material. Heating to a product temperature as low as about 160° F. results in some benefits, although a temperature about 250° F. is preferred since superior reinforcing properties are realized by my fillers produced at this higher temperature. Temperatures as high as about 350° F. can be used provided local overheating does not char the organic coating.

The quantity of halogenated phosphorus ester coating employed is within the limits of about ½ to 5 percent of the dry clay weight. The optimum quantity of coating agent used may vary somewhat with the particle size of the clay and is usually within the range of about 1½ to 2½ percent of the clay weight. While increments in the quantity of coating agent result in clay filled polyester systems of lower viscosity, the amount of coating agent employed is limited by the fact that the use of excessive coating agent reduces the strength of the molded polyester resin which is formulated with the coated clay.

The liquid unsaturated polyester resins employed in producing improved molding compositions of this invention are obtained by reacting a dihydric alcohol and a dibasic acid, either of which contains a pair of double bonded carbon atoms. The unsaturated long chain polyester molecule is essentially linear and is capable of being crosslinked to form a thermosetting resinous solid through the double bonds in the ester. A liquid unsaturated monomer, such as styrene, is employed as a crosslinking solvent, and an organic peroxide is usually employed to catalyze the crosslinking reaction. The thermoset product consists of a long chain ester linked into a three-dimensional resin with a carbon-to-carbon crosslinks. The unsaturated polyesters are characterized by thermosetting without evolution of water. Commercial unsaturated polyester resins usually contain a mixture of unsaturated polyesters and unsaturated monomeric solvent.

Polyols used in the preparation of commercial polyesters include: ethylene glycol; propylene glycol; 1:3 butylene, 2:3 butylene and 1:4 butylene glycols; diethylene glycol and triethylene glycol.

Maleic anhydride and fumaric acid are the unsaturated acids most frequently used in the preparation of unsaturated polyesters; maleic acid is used to a lesser extent. Other suitable unsaturated acids are citraconic acid, mesaconic acid, itaconic acid and 3:6 endomethylene tetrahydro phthalic anhydride. Equimolal proportions of glycol and dibasic acid are usually used. The unsaturated acid is frequently modified with a saturated dibasic acid, usually phthalic acid or anhydride, sebacic acid and adipic acid, to improve the flexibility of the thermoset product. In some instances, trihydric alcohols, such as glycerine or castor oils, or higher alcohols, such as pentaerythritol or sorbitol, are used to modify the product.

Styrene, diallylphthalate and triallyl cyanurate are the principal crosslinking monomeric agents.

As mentioned, the crosslinking reaction is catalyzed with a peroxide catalyst, usually benzoyl peroxide. Other catalysts are methylethylketone peroxide and methyl isobutyl ketone peroxide.

Accelerators, stabilizers, promotors, coloring agents may be incorporated in the polyester when desired, as well as auxiliary fillers such as fibrous asbestos, calcium carbonates, etc.

In the preparation of moldable polyester mixes employing the novel coated kaolin, the clay is added to the unsaturated liquid polyester resin in the same manner and with equipment usually employed for adding clay or other fillers to the resin.

The quantity of coated clay I prefer to employ is from 10 to 200 percent, based on the weight of the liquid unsaturated polyester (inclusive of the polymerizable monomer, such as styrene). In the preparation of gunk molding mixtures containing glass fibers I prefer to employ about 50 to 150 parts of coated clay to 100 parts by weight of liquid polyester; in some instances the quantity of glass fibers may be reduced from that normally employed in premixes when my coated clay is used; a suggested proportion of glass fibers is from 10 to 30 parts per 100 parts of polyester. In laminating mixes, I prefer to use from about 20 to 100 parts by weight of coated clay to 100 parts by weight of polyester.

After the coated clay is dispersed in the liquid, polymerizable unsaturated monomer and catalyst added, the mixture is placed in a suitable mold and cured in a manner applicable to the particular polyester resin employed.

My invention is illustrated in further detail by the following examples in which all proportions of ingredients are in parts by weight unless otherwise specified.

EXAMPLE I

In accordance with this invention, samples of Georgia kaolin clay were coated with tris(2-chloroethyl) phosphite in amount of 0.5 to 2.0 percent (based on the weight of the clay after drying to constant weight at 220° F.). The clays were: a degritted coarse size fraction of Georgia kaolin clay having an average equivalent spherical diameter of 4.8 microns; a degritted Georgia kaolin clay having an average equivalent spherical diameter of 1.5 microns; and a fine size fraction of Georgia kaolin having an average equivalent spherical diameter of 0.5 micron.

In the preparation of the various coated clays, the dry clay was placed in a mixing vessel. To the clay there was added slowly with agitation a 10 percent solution of tris(2-chloroethyl) phosphite in mineral spirits. Mixing was conducted at room temperature. The materials were rapidly agitated for ten minutes after all of the coating material had been added, and the wet samples were held in a forced draft oven at 160° F. for 1¼ hours for drying. After drying, the samples were placed in a high speed hammer mill while they were still hot and the milled samples, after cooling, were placed in sealed glass jars.

1(a). To illustrate that kaolin clay which has been coated with a tri-chloroalkyl phosphite, in accordance with this invention, is readily dispersible in a liquid polyester and that the coating does not adversely effect the viscosity of the kaolin filled polyester resin, the rheology of an unsaturated liquid polyester resin containing the coated clay of this invention was compared with the rheology of the polyester without filler and the rheology of the polyester containing the same quantity of uncoated clay. The unsaturated polyester employed in all tests was a low reactivity polyester (Polylite 8007) prepared by esterification of ethylene glycol with fumaric acid and containing 40 percent styrene monomer. Viscosity measurements were made immediately after preparation of the polyester compositions and also after the compositions had aged seven days. The results are tabulated in Table I.

organic phosporus ester outside the scope of this invention. The procedure used in coating clay with the phosphonate was the same employed in coating the clay with the tri-chloroalkyl phosphite. The results are tabulated in Table II.

In the preparation of the moldings, portions of the freshly prepared resin-filler mixes of Example 1(a) were molded after addition of 1 percent of benzoyl peroxide catalyst (based on the weight of polyester including styrene monomer). The mixes were cast in a glass mold which consisted of a U-shaped piece of ⅛-inch asbestos gasketing 1-inch wide and having 12-inch legs. Silicone mold releasing agent was applied to the gasket which was placed between two pieces of plate glass (each 1-foot square) and which had been sprayed with mold release agent. This assembly was secured and filled with the resin filler mixture.

The resin was cured by placing the filled mold in a cold forced draft oven and raising the oven temperature to 180° F. in an hour. The temperature was held at

*Table I*

THE EFFECT OF COATING VARIOUS PARTICLE SIZES OF KAOLIN CLAY WITH CHLORINATED ORGANIC PHOSPHORUS ESTERS ON THE VISCOSITY OF SUSPENSIONS IN AN UNSATURATED POLYESTER RESIN

| Clay Filler Av. Equivalent Spherical Diam. | Clay Coating | Percent Coating | Brookfield Viscosity, cp.×10³ | | | |
|---|---|---|---|---|---|---|
| | | | 10 r.p.m. | 100 r.p.m. | 10 r.p.m. | 100 r.p.m. |
| | | | Initial | | After 7 Days | |
| No filler | | | 4.2 | 4.3 | 4.5 | 4.5 |
| 4.8 microns [1] | No coating | | 9.7 | 4.3 | 8.5 | 4.5 |
| 4.8 microns [1] | Tris(2-chloroethyl)phosphite | 0.5 | 7.1 | 3.8 | 7.0 | 4.1 |
| 1.5 microns [1] | No coating | | 29.5 | 8.6 | 23.5 | 7.6 |
| 1.5 microns [1] | Tris(2-chloroethyl)phosphite | 1 | 28.4 | 9.0 | 28.0 | 10.0 |
| 0.5 micron [2] | No coating | | 15.5 | 4.3 | 11.1 | 4.1 |
| 0.5 micron [2] | Tris(2-chloroethyl)phosphite | 2 | 15.1 | 5.7 | 14.3 | 6.3 |

[1] 40 parts clay/60 parts resin.
[2] 30 parts clay/70 parts resin.

The results reported in Table I show that the viscosity of the liquid polyester resin, containing various coated clays of this invention, was usually about the same as, or less than, the viscosity of the resin containing the same particle size uncoated clay at all rates of shear.

In all cases the coated kaolin fillers were more readily dispersed in the liquid resin than the uncoated clays.

1(b). The strength characteristics of molded premix Polylite 8007 resins which were filled with kaolin clay previously coated with various quantities of tris(2-chloroethyl) phosphite was measured and compared with the strength characteristics of (1) the unfilled resin, (2) the same resin filled with the same quantities of uncoated clay, and (3) the resin filled with kaolin coated with bis-(chloropropyl) 2-propene phosphonate, a halogenated 180° F. for one hour and shut off. The mold and oven were permitted to cool to room temperature. The results are presented in Table II.

*Table II*

THE EFFECT OF COATING VARIOUS PARTICLE SIZES OF KAOLIN CLAY FILLERS WITH CHLORINATED ORGANIC PHOSPHORUS ESTERS ON THE STRENGTH PROPERTIES OF MOLDED UNSATURATED POLYESTER RESIN

| Clay Filler Av. Equivalent Spherical Diam. | Clay Coating | Tensile Strength, p.s.i.×10³ ASTM: D638-58T | Flexural Strength, p.s.i.×10³ ASTM: D790-58T | Barcol Hardness |
|---|---|---|---|---|
| No filler | | 8.47 | 10.25 | 39.5 |
| 4.8 microns [1] | No coating | 5.34 | 9.69 | 42.8 |
| 4.8 microns [1] | 0.5% tris(2-chloroethyl)phosphite | 6.81 | 11.57 | 43.4 |
| 1.5 microns [1] | No coating | 4.13 | 8.29 | 44.8 |
| 1.5 microns [1] | 1% tris(2-chloroethyl)phosphite | 4.60 | 10.20 | 46.0 |
| 0.5 micron [2] | No coating | 5.27 | 9.71 | 43.4 |
| 0.5 micron [2] | 2% tris(2-chloroethyl)phosphite | 4.89 | 10.42 | 44.4 |
| 1.5 microns [1] | 1% bis(chloropropyl)2-propene phosphonate. | 2.58 | 5.96 | |

[1] 40 parts clay/60 parts resin.
[2] 30 parts clay/70 parts resin.

Data in Table II show that in every instance the presence of tris(2-chloroethyl) phosphite coating on the clay filler resulted in an increase in tensile strength, flexural strength and Barcol hardness of the clay-filled polyester plastic. The flexural strength of all plastics filled with tris(2-chloroethyl) phosphite coated kaolin clay was at least as great as that of the unfilled plastic while the flexural strength of plastics filled with uncoated clay was always less than that of the unfilled plastic.

In contrast with the above-mentioned benefits realized by coating the clay with a tri-chloroalkyl phosphite, the flexural strength and tensile strength of the resin filled with clay coated with bis(chloropropyl) 2-propene phosphonate, a halogenated organic phosphorus ester outside the scope of this invention, were appreciably less than that of the plastic filled with uncoated clay. Thus, coating the clay with bis(chloropropyl) 2-propene phosphonate impaired the utility of the clay as a polyester filler.

EXAMPLE II

This example illustrates the advantages of coating a calcined kaolin pigment for a polyester gel coat with a tri-haloalkyl phosphate ester. A sample of a commercial calcined kaolin pigment was coated with 1 percent by weight of tris(2-chloroethyl) phosphate by the solution coating technique and 160° F. heat treatment described in the previous example. The flexural modulus and hardness of gel coats pigmented with the coated and uncoated calcined kaolin pigments were measured.

In producing clay pigmented polyester gel coats, the clay pigment was mixed into a commercial resilient isophthalic acid modified gel coat grade unsaturated liquid polyester resin previously thickened by addition of 1 percent by weight of a commercial colloidal silica, using a quantity of polyester sufficient to form a paste with the polyester. The paste was mixed thoroughly with a high speed agitator until heating developed and the remaining resin was added with mixing. The mixtures were catalyzed with 1 percent methyl ketone peroxide, placed in ⅛-inch plate glass molds, cured and post-cured at 250° F. for two hours.

The gel coat formulation was as follows:

| | Parts by weight |
|---|---|
| Polyester resin | 70. |
| Calcined clay pigment | 30. |
| Colloidal silica | 1% based on weight of resin. |
| Methyl ethyl ketone peroxide | 1% based on weight of resin. |

Viscometric evaluations of the unfilled and filled resin compositions are given in Table III. Strength properties of the same compositions after molding are given in Table IV.

Table III
PROPERTIES OF POLYESTER GEL COAT RESINS FORMULATED WITH CALCINED KAOLIN CLAY PIGMENT

| Pigment | Brookfield Viscosity | | | |
|---|---|---|---|---|
| | ½ r.p.m. | 100 r.p.m. | ½ r.p.m. | 100 r.p.m. |
| | Initial | | After 7 days | |
| None | 400 | 357 | 400 | 383 |
| Calcined kaolin | 19,600 | 1,384 | 16,800 | 1,308 |
| Calcined kaolin [1] | 8,000 | 1,162 | 7,600 | 1,162 |

[1] Coated with 2% tris(2-chloroethyl) phosphate.

Data in Table III for viscometric properties of resin mixes indicate that high and low shear viscosities of resin containing coated clay are appreciably less than those of resins containing the uncoated calcined clay and also that a highly desirable thixotropic level can be obtained by using calcined clay pigment coated with a chloroalkyl phosphate ester.

Table IV
PROPERTIES OF POLYESTER GEL COATS FORMULATED WITH CALCINED KAOLIN CLAY PIGMENT

| Pigment | Gel Time, Min. | Flexural Strength, p.s.i.×10³ | Flexural Modulus, p.s.i.×10³ | Barcol Hardness |
|---|---|---|---|---|
| None | 35 | 15.0 | 409 | 16 |
| Calcined kaolin | 45 | 7.4 | 640 | 33 |
| Calcined kaolin [1] | 44 | 11.4 | 625 | 36 |

[1] Coated with 2% tris(1-chloroethyl) phosphate.

Data in Table IV show the marked improvement in flexural strength and hardness of the cured calcined kaolin pigmented gel coat obtained by precoating the pigment with 2 percent of tris(2-chloroethyl) phosphate. The flexural modulus value of the gel coat made with coated clay is slightly lower than that of the gel coat made with the uncoated clay, indicating a tougher composition has been produced and that the flexural strength improvement has not been the result of embrittling.

EXAMPLE III

This example illustrates the use of tri-chloroalkyl phosphate coated kaolin clay as a filler for a preform polyester laminate.

A coarse size fraction of Georgia kaolin clay (average equivalent spherical diameter of 4.8 microns) was coated with 1 percent by weight of tris(2-chloroethyl) phosphate by mixing the bone dry clay with organo-phosphate coating agent in a V-blender, heating the mixture to 350° F. without charring the phosphate and passing the heated mixture through a screen mill with 0.039-inch screen openings.

In preparing clay-filled laminates, the clay (coated or uncoated) was initially thoroughly dispersed in the liquid unsaturated polyester using 30 parts by weight filler and 70 parts by weight resin. Benzoyl peroxide in amount of 1 percent by weight of the resin was added. The mixture was poured on a glass mat (two layers of chopped strand 2 oz. mat placed in a 12″ x 12″ mold with 30 mil polysilane surfacing mat on top). The laminates were made up to maintain the glass fiber content within the limits of 111–113 gm. glass/sq. ft. Laminates were cured for 5 minutes at 250° F. at a maximum pressure of 9100 p.s.i.

The procedure was carried out using two different liquid unsaturated polyester resins: Resin A was the Polylite 8007 resin used in Example I; Resin B was the isophthalic acid modified resilient type resin containing 20 percent styrene that had been used in Example II.

Table V
EFFECT OF PRECOATING KAOLIN CLAY FILLER WITH CHLORINATED TRIALKYL PHOSPHATE ON PROPERTIES OF PREFORM LAMINATES (30% FILLER, 70% RESIN)

| Kaolin Clay Filler | Brookfield Viscosity, cp.[1] | | Flexural Strength | Flexural Modulus p.s.i.×10⁶ |
|---|---|---|---|---|
| | 5 r.p.m. | 100 r.p.m. | | |
| Resin A | | | | |
| Uncoated | 6,800 | 1,330 | 27,380 | 1.04 |
| Coated [2] | 4,000 | 1,262 | 36,020 | 1.23 |
| Resin B | | | | |
| Uncoated | | | 21,350 | 1.10 |
| Coated [2] | | | 23,740 | 1.12 |

[1] Mixes formulated, vacuum degassed and aged overnight before testing
[2] 1% tris(2-chloroethyl) phosphate, heated to 350° F. in presence of clay.

Strength data in Table V for kaolin filled preform polyester laminates show that in the case of both resins, precoating the clay filler with tris(2-chloroethyl) phosphate effected a substantial improvement in flexural strength with a slight increase in modulus. Viscosity data in Table V show that the viscosity of the resin formulated with cated clay was appreciably lower at high and low shear rates than that of the resin containing uncoated clay.

EXAMPLE IV

This example illustrates the desirable effect of heating kaolin clay coated with tris(2-chloroethyl) phosphate before incorporating the coated clay into a liquid unsaturated polyester mix.

The 4.8 micron degritted Georgia kaolin was treated with a 10 percent solution of tris(2-chloroethyl) phosphate in mineral spirits and dried in a forced air oven, as in the previous examples. One portion of the coated clay was maintained at room temperature at about 72° F. before milling; another portion was heated to a product temperature of 250° F. before milling and milled hot. All samples were screened to 0.039 inch.

Each of the fillers was mixed into a liquid unsaturated polyester resin (Polylite 8007) with mid agitation using 30 parts filler and 70 parts resin. Each resin-filler mix was made into a preform laminate using 4 oz. of Fiberglas mat. The molding and curing procedure was the same as employed in the previous example. Results are summarized in Table VI.

Table VI

EFFECT OF PREHEATING COATED CLAY ON PROPERTIES OF POLYESTER RESINS FILLED WITH COATED CLAY

| Percent tris(2-chloroethyl) phosphate coating, based on clay weight | Temperature to which clay was heated after coating and before milling | Initial Brookfield Viscosity, cp. | | Average Flexural Strength, p.s.i. |
|---|---|---|---|---|
| | | 0.5 r.p.m. | 100 r.p.m. | |
| 1.0 | Room temperature | 9,200 | 1,370 | 20,983 |
| 1.0 | 250° F | 8,000 | 1,202 | 23,403 |

Data in Table VI show that resin viscosity decreased with increase in temperature of processing the coated clay filler and that the flexural strength of the molded laminate increased with increase in temperautre of processing the chloroalkyl phosphate coated clay.

I claim:
1. Kaloin clay, the particles of which are uniformly coated with a small amount of a phosphorus ester material selected from the group consisting of a tri-chloroalkyl ester of phosphoric acid in which said alkyl group contains from 2 to 3 carbon atoms and a tri-chloroalkyl ester of phosphorus acid in which said alkyl group contains from 2 to 3 carbon atoms.

2. The composition of claim 1 wherein said clay has been heated at a temperature within the range of about 1650° F. to about 1800° F. for a time sufficient to dehydrate said clay substantially completely prior to being coated with said ester.

3. Kaolin clay, the particles of which are uniformly coated with a small amount of a tri-chloroalkyl ester of phosphoric acid in which said alkyl group contains from 2 to 3 carbon atoms.

4. The composition of claim 3 wherein said ester is tris-(2-chloroethyl) phosphate.

5. The composition of claim 3 wherein said kaolin clay has been heated at a temperature within the range of about 1650° F. to about 1800° F. for a time sufficient to dehydrate said clay substantially completely prior to being coated with said ester.

6. Kaolin clay, the particles of which are uniformly coated with a small amount of a tri-chloroalkyl ester of phosphorous acid in which said alkyl group contains from 2 to 3 carbon atoms.

7. The composition of claim 6 wherein said ester is tris(2-chloroethyl) phosphite.

8. The composition of claim 6 wherein said kaolin clay has been heated at a temperature within the range of about 1650° F. to about 1800° F. for a time sufficient to dehydrate said clay substantially completely prior to being coated with said ester.

9. Kaolin clay, the particles of which are uniformly coated with from about ½ percent to about 5 percent by weight of a phosphorus ester material selected from the group consisting of a tri-chloroalkyl ester of phosphoric acid in which said alkyl group contains from 2 to 3 carbon atoms and a tri-chloroalkyl ester of phosphorous acid in which said alkyl group contains from 2 to 3 carbon atoms, said ester material having been heated in the presence of said clay to a temperature of at least 160° F. and below a temperature at which said ester chars.

10. The composition of claim 9 wherein said clay is coated with about 1½ percent to about 2½ percent of said ester.

11. The composition of claim 9 wherein said kaolin clay had been heated at a temperature within the range of about 1650° F. to about 1800° F. for a time sufficient to dehydrate said clay substantially completely prior to being coated with said ester.

References Cited by the Examiner

UNITED STATES PATENTS

| 2,948,632 | 8/1960 | Albert | 260—40 XR |
| 2,975,147 | 3/1961 | Abbott | 260—40 XR |
| 3,014,836 | 12/1961 | Proctor | 106—72 |
| 3,032,431 | 5/1962 | Ferrigno | 260—40 XR |
| 3,196,190 | 7/1965 | Nischk et al. | 260—967 |

FOREIGN PATENTS

| 578,587 | 5/1959 | Belgium. |
| 825,869 | 12/1959 | Great Britain. |

MORRIS LIEBMAN, *Primary Examiner.*

MILTON STERMAN, *Examiner.*

A. H. KOECKERT, *Assistant Examiner.*